United States Patent
Inoue et al.

[11] Patent Number: 6,123,364
[45] Date of Patent: Sep. 26, 2000

[54] PIPE JOINT

[75] Inventors: Hiroshi Inoue, 1012-1, Amano-cho, Kawachinagano-shi, Osaka; Hiroji Sakatani, Kawachinagano, both of Japan

[73] Assignees: Higashio Mech Co., Ltd.; Hiroshi Inoue, both of Kawachinagano, Japan

[21] Appl. No.: 09/461,007

[22] Filed: Dec. 15, 1999

[30] Foreign Application Priority Data

Jun. 28, 1999 [JP] Japan .................................. 11-182302

[51] Int. Cl.$^7$ ................................................ F16L 35/00
[52] U.S. Cl. ........................... 285/40; 285/328; 285/104; 285/353; 285/384; 285/391; 411/267; 411/269
[58] Field of Search .................................. 411/267, 268, 411/269, 270, 433; 285/104, 105, 318, 328, 40, 353, 384, 385, 251, 250, 334.4, 391

[56] References Cited

U.S. PATENT DOCUMENTS

| 1,711,995 | 5/1929 | Erickson | 285/318 |
| 2,127,284 | 8/1938 | Board | 285/104 |
| 2,346,051 | 4/1944 | Seamark | 285/318 |
| 3,384,393 | 5/1968 | Gilchrist | 285/105 |
| 4,005,884 | 2/1977 | Drori | 285/105 |
| 4,358,215 | 11/1982 | Rivin | 285/318 |
| 4,540,201 | 9/1985 | Richardson | 285/104 |
| 5,299,838 | 4/1994 | Yang | 285/104 |
| 5,522,624 | 6/1996 | Edin | 285/40 |

FOREIGN PATENT DOCUMENTS

1958205 5/1971 Germany .................................. 285/104

Primary Examiner—Eric K. Nicholson
Attorney, Agent, or Firm—Armstrong, Westerman, Hattori, McLeland & Naughton

[57] ABSTRACT

A pipe joint provided with a joint main body having a tapered female screw portion on an opening end, and a cylindrical retainer having a male screw portion screwed into the female screw portion and plural small-disc continuous bodies each of which is composed of two or three small discs for pipe fixation embedded in the male screw portion along with the thread as a part of the small disc protrudes from a peripheral side and another part of the small disc protrudes from an inner peripheral face.

7 Claims, 9 Drawing Sheets

PIPE JOINT

BACKGROUND OF THE INVENTION

1. Field of the Invention

This invention relates to a pipe joint.

2. Description of the Related Art

Conventionally, it is widely practiced that an end of a connected pipe is cut to be a tapered male screw portion to which a female screw portion of a pipe joint is screwed.

However, with this pipe joint, when the job site is small and a joint main body is large or L-shaped, an inconvenience that the joint main body is often unable to be rotated and screwed to the connected pipe is caused. And, in case that wall-thickness of the connected pipe is thin (such as a copper pipe), cutting the male screw portion is difficult or impossible, and a problem that the pipe joint has to have a complicated mechanical connecting construction is caused thereby.

It is therefore an object of the present invention to provide a pipe joint, having a simple construction, with which connecting operation can be easily and swiftly conducted in a small jobsite, fixation of the connected pipe becomes strong, and stable connected state can be kept without looseness.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
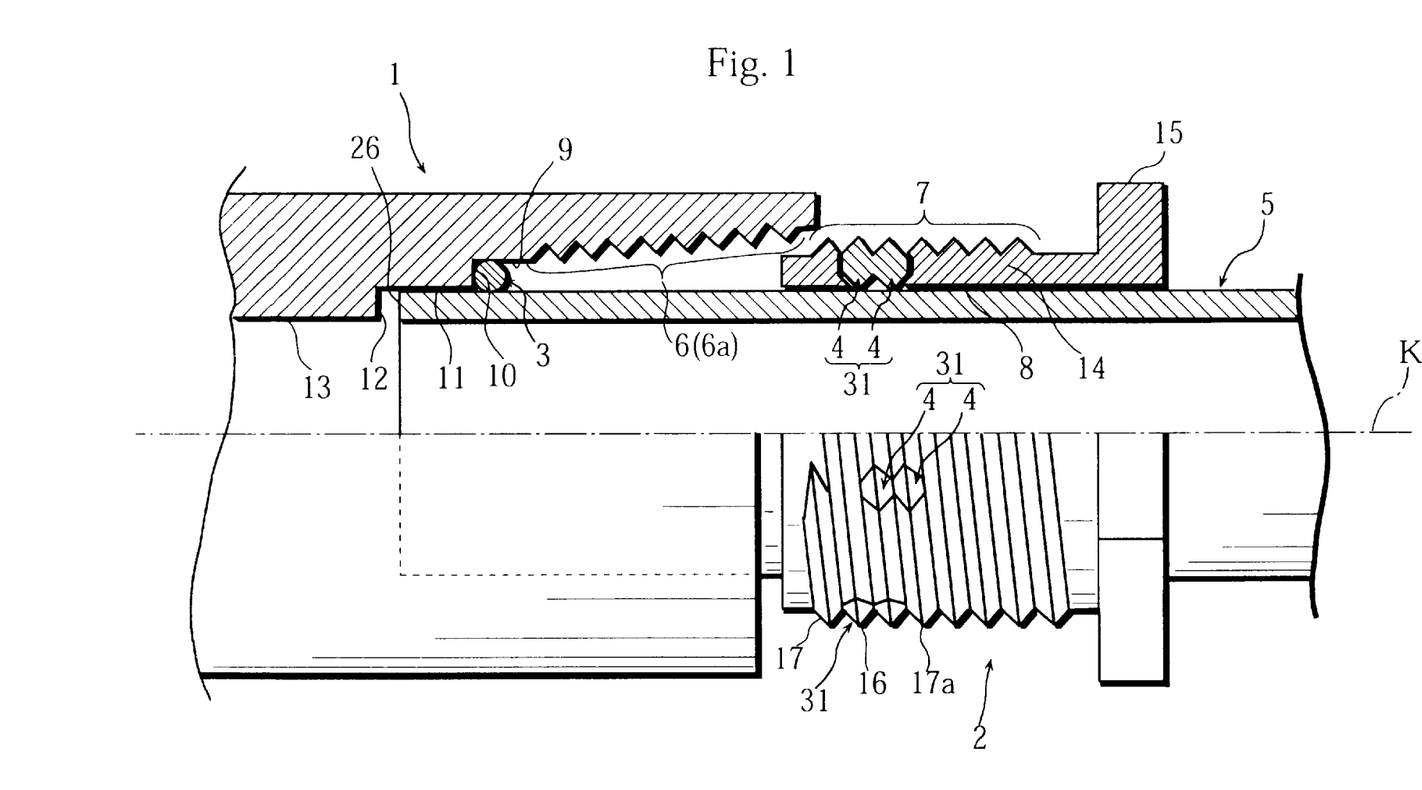
FIG. 1 is a half cross-sectional view of principal portion showing a preferred embodiment of a pipe joint of the present invention.

FIG. 1 shows a preferred embodiment of the present invention. This pipe joint is provided with a joint main body 1 having a female screw portion 6 on which a tapered female screw portion 6a is formed on an opening end, a cylindrical retainer 2 having a (tapered) male screw portion 7 which screws into the female screw portion 6 (the tapered female screw portion 6a) of the joint main body 1, and a sealant 3. And, the retainer 2 has plural small-disc continuous bodies 31 each of which is composed of two or three small discs 4 for pipe fixation embedded in the male screw portion 7 as that a part of the small disc 4 protrudes from a peripheral side along the thread of the male screw portion 7 and another part of the small disc 4 protrudes from an inner peripheral face 8.

To describe concretely, the cylindrical joint main body 1 has the female screw portion 6, a parallel portion for sealing 9, a first stepped portion 10, a connected pipe insertion portion 11, a second stepped portion 12, and a duct hole 13, in this order in an axis K direction starting with an open end of the main body 1. The first stepped portion 10 is arranged to be circular, and a ring of the sealant 3 is placed between the first stepped portion 10 and the parallel portion 9.

And, the retainer 2 made of plastic has the above male screw portion 7 on a peripheral face of a cylinder portion 14 and a polygonal outer brim portion 15 on a base end of the cylinder portion 14.

Figure 2A:
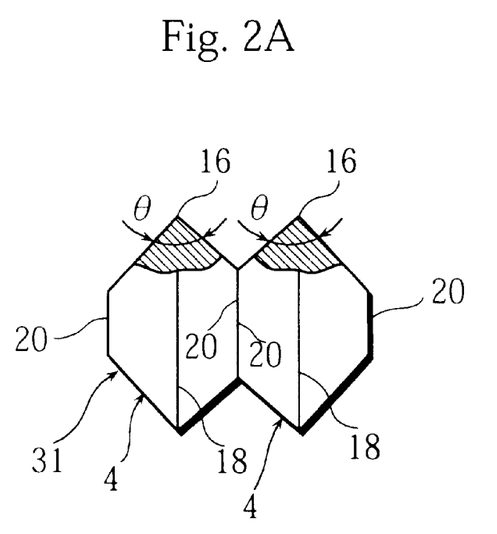
FIG. 2A is an explanatory view of a small-disc continuous body.
Figure 2B:
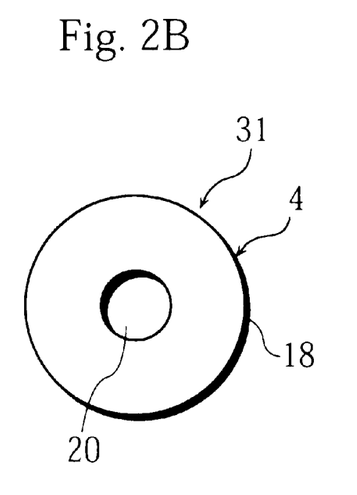
FIG. 2B is an explanatory view of the small-disc continuous body.

Next, as shown in FIG. 2, the small-disc continuous body 31 is composed of two connected small discs 4. And, the small disc 4 is made of metal (hardened steel or stainless steel, for example), hexagonal in front view as shown in FIG. 2A, and circular in side view as shown in FIG. 2B. External configuration of the small disc 4 is a bead of an abacus having a sharp circular peripheral edge 18 and circular plane portions 20 raised on both sides of the circular peripheral edge 18. And, the small-disc continuous body 31 is formed by connecting two small discs 4 as the circular plane portions 20 are fitted each other.

And, as shown in FIG. 1 and FIG. 2, in a longitudinal cross-section including the axis K of the joint main body 1, cross-sectional configuration of an outside peak portion 16 of the small disc 4 of the small-disc continuous body 31 is formed to be approximately same as that of a ridge portion 17 of the male screw portion 7. That is to say, an angle θ of the outside peak portion 16 of the small disc 4 is set to be approximately same as screw angle of the male screw portion 7 (an angle of a peak portion 17a of the ridge portion 17), and the outside peak portion 16 forms a part of the peak portion 17a of the ridge portion 17. And, the small-disc continuous body 31 is formed as to screws to the female screw portion 6 of the joint main body 1 between the connected plural (two) small discs 4. Strength of screwed connection between the retainer 2 and the joint main body 1 is kept thereby.

Figure 3A:
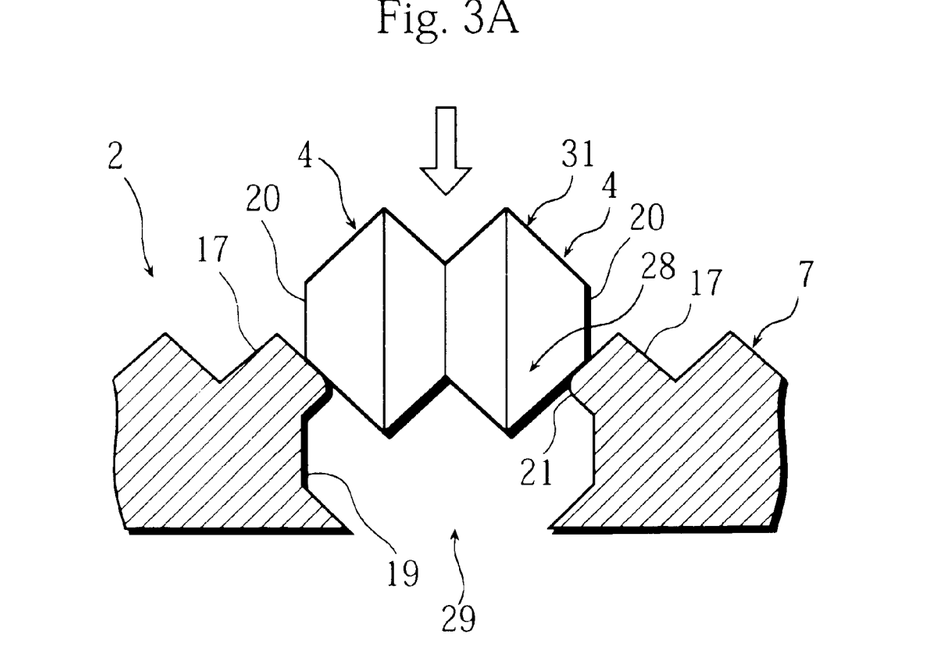
FIG. 3A is a working-explanatory view showing press-fitted state of the small-disc continuous body to a hole portion of a retainer.
Figure 3B:
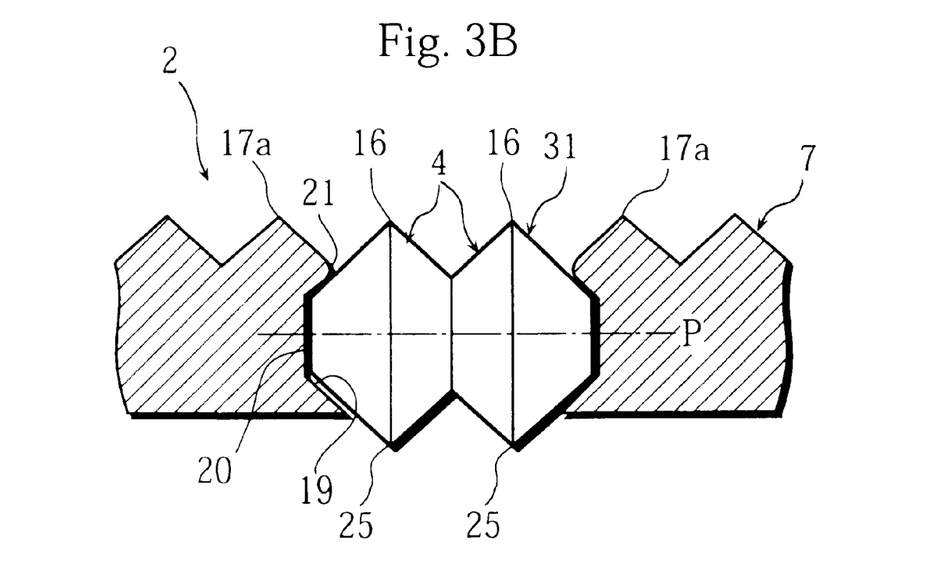
FIG. 3B is a working-explanatory view showing a press-fitted state of the small-disc continuous body to the hole portion of the retainer.

And, as shown in FIG. 1 and FIG. 3, in the retainer 2 made of plastic, plural hole portions 19 for embedding the small-disc continuous body 31 are formed in plastic forming, and the small-disc continuous body 31 of metal is embedded by press-fitting to each of the hole portions 19.

To describe further in detail, the hole portion 19 of the retainer 2 has an outer opening portion 28 for protrusion of outside peak portions 16 of the small-disc continuous body 31 on a peripheral side and an inner opening portion 29 for protrusion of inside peak portions 25 on an inner peripheral side. Inside of the hole portion 19 is formed to be wider than the outer opening portion 28 and the inner opening portion 29, and surrounding the (above described) circular plane portions 20 of the small-disc continuous body 31. And, the outer opening portion 28 is wider than the inner opening portion 29, and an opening edge 21 is rounded.

FIG. 3A shows a state before press-fitting of the small-disc continuous body 31 to the hole portion 19 of the retainer 2. The small-disc continuous body 31 is pressed to the hole portion 19 side from the outer opening portion 28, the outer opening portion 28 is enlarged by elastic deformation of plastic, the circular plane portions 20 of the small-disc continuous body 31 slide over the opening edge 21 and fit into the inside of the hole portion 19 as shown in FIG. 3B, and the small-disc continuous body 31 is embedded into the hole portion 19 as to be able to rotate around an axis P going through the center of the circular plane portions 20.

And, to connect the pipe joint of the present invention and a connected pipe 5, as shown in FIG. 1, an end portion of the connected pipe 5 inserted to a hole of the retainer 2 is inserted to the connected pipe insertion portion 11, and the connected pipe 5 is positioned as an end face 26 of the connected pipe 5 contacts the second stepped portion 12. In this case, a duct inside the connected pipe 5 is connected to the duct hole 13 of the joint main body 1. Further, viscous liquid sealant is painted beforehand on the inner peripheral face 8 of the hole portion of the retainer 2 and the peripheral face of the male screw portion 7 for tight closing of between the retainer 2 and the joint main body 1, and between the retainer 2 and the connected pipe 5. Infiltration of water outside and electric erosion of connected part of the pipes are prevented thereby.

Figure 4:
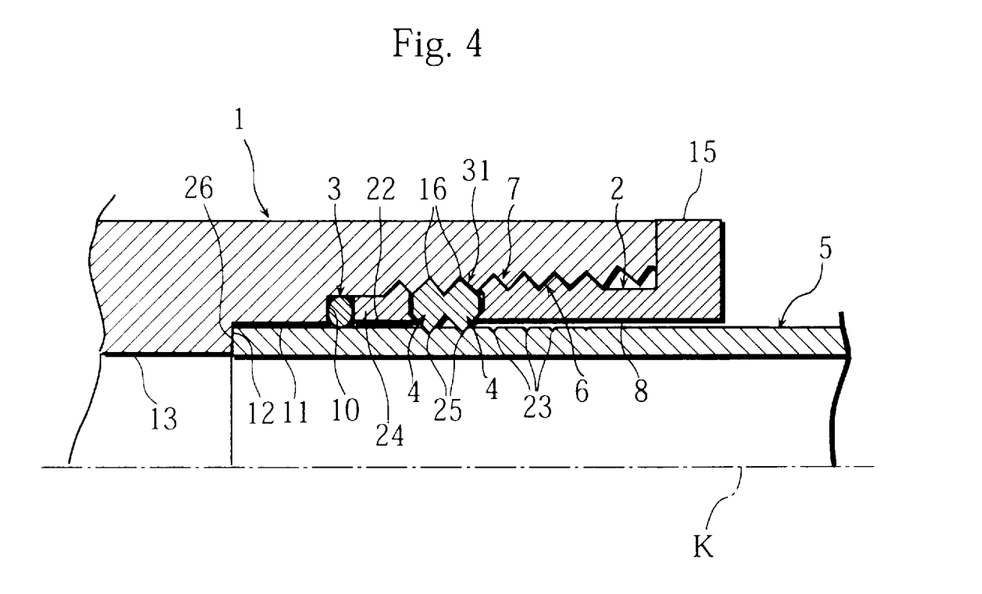
FIG. 4 is a cross-sectional front view of a principal portion showing a connected state.

And, the male screw portion 7 of the retainer 2 is screwed to the female screw portion 6 of the joint main body 1, and the retainer 2 is screwed into a gap between the male screw portion 7 of the joint main body 1 and the connected pipe 5 until an end face of the outer brim portion 15 contacts the joint main body 1 as shown in FIG. 4.

In this case, the small-disc continuous body 31 is prevented from escaping by the outside peak portions 16 sliding on the female screw portion 6, and the inside peak portions 25, protruding from the inner peripheral face 8 of the retainer 2, can certainly bite into a peripheral face 22 of the connected pipe 5 thereby. In further detail, the inside peak portions 25 of the peripheral edges 18 of first small-disc continuous body 31 (arranged most proximate to the joint main body 1 side) among the small-disc continuous bodies 31 gradually bite into a peripheral face 22 of the connected pipe 5 as the retainer 2 screws into, and form spiral bite traces 23. In case that an interrupting small convex portion is on the peripheral face 22, the small-disc continuous body 31 gets over the small convex portion, and the retainer 2 is smoothly screwed until the end.

And, inside peak portions 25 of the peripheral edges 18 of second and following small-disc continuous bodies 31 proceed along the formerly formed bite traces 23 (or proceed biting into the peripheral face further), and hitch on the bite traces 23. That is to say. the small-disc continuous bodies 31 bite into the connected pipe 5. As described above, fixation of the connected pipe 5 is conducted strongly by the biting of the plural small-disc continuous bodies 31 into the peripheral face 22 of the connected pipe 5.

And, an end 24 of the retainer 2 presses the sealant 3 to the first stepped portion 10 side of the joint main body 1, a gap surrounded by the joint main body 1, the connected pipe 5, and the retainer 2 is tightly closed thereby, and leakage of fluid is prevented in use thereafter. And, a worker can visually check accurate screwing and swiftly conduct connecting operation because it is arranged that the sealant 3 is appropriately pressed and the small-disc continuous bodies 31 of the male screw portion 7, which screws into the female screw portion 6, deeply bite into the connected pipe 5 by screwing the retainer 2 until the outer brim portion 15 contacts the joint main body 1.

Figure 5:
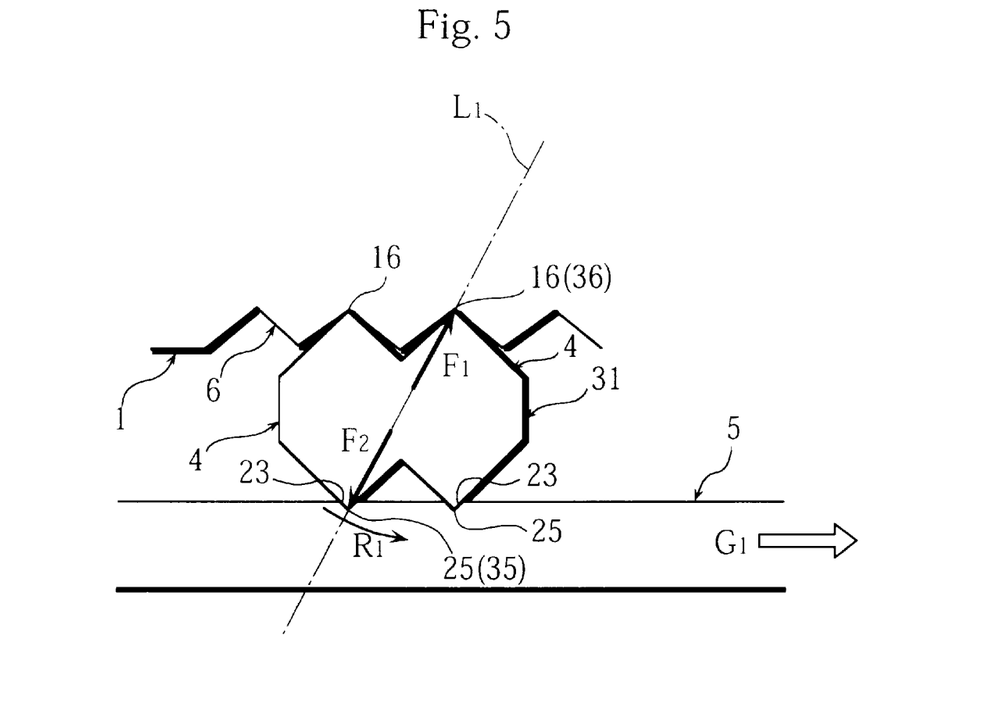
FIG. 5 is a working-explanatory view of a small-disc continuous body.

And, in a completed state of fastening (connection) of the retainer 2 and the joint main body 1, as shown in FIG. 5, when a drawing force in an arrow $G_1$ direction (parting from the joint main body 1) works on the connected pipe 5, resisting force $F_1$ is generated on a position of an outer outside peak portion 36 (the nearest to the opening end side of the joint main body 1) of the small-disc continuous body 31, and resisting force $F_2$ is generated on a position of an inner inside peak portion 35 (the nearest to the innermost part of the joint main body 1) of the small-disc continuous body 31, and the fixation of the connected pipe 5 becomes strong further.

To describe concretely, when the drawing force in the arrow $G_1$ direction works on the connected pipe 5 in a state that the small-disc continuous body 31 hitches on the joint main body 1 and the connected pipe 5, rotational force in an arrow $R_1$ direction around the outer outside peak portion 36 as a center. That is to say, the resisting force $F_1$ to the joint main body 1 side is generated on the outer outside peak portion 36 and the resisting force $F_2$ to the connected pipe 5 is generated on the inner inside peak portion 35 in an imaginary line $L_1$ direction going through the outer outside peak portion 36 and the inner inside peak portion 35. And, the inner inside peak portion 35 bites into the bite trace 23 further.

Therefore, the more the drawing force of the connected pipe 5 becomes, the more biting force of the inner inside peak portion 35 of the small-disc continuous body 31 to the connected pipe 5 becomes, and the fixation of the connected pipe 5 becomes strong further. And, the small-disc continuous body 31 can hold a stable position.

Figure 6:
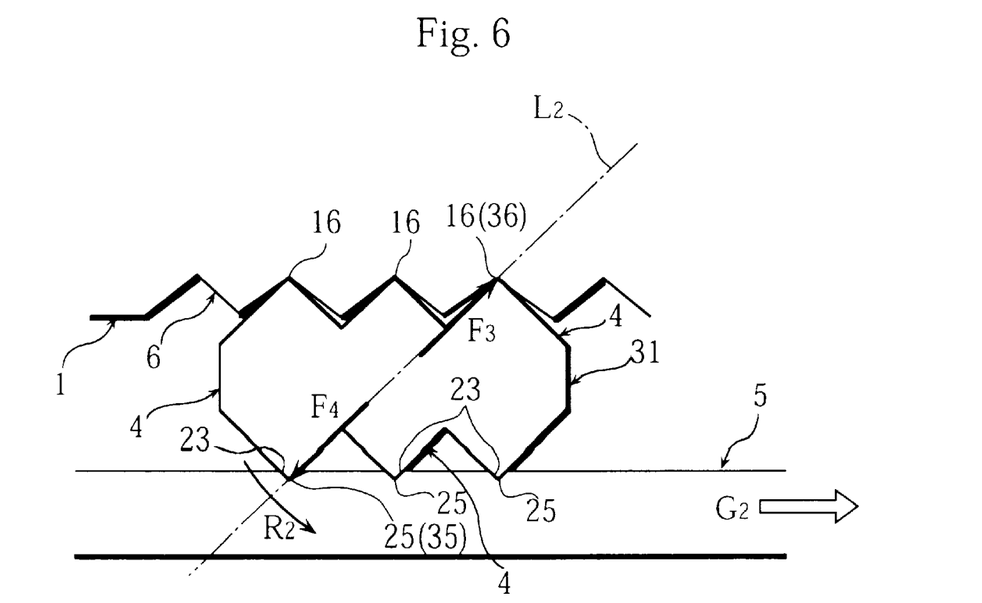
FIG. 6 is a working-explanatory view of a small-disc continuous body.

As shown in FIG. 6, the small-disc continuous body 31 may be composed of three small discs 4 with which the fixation of the connected pipe 5 becomes stronger in comparison with the small-disc continuous body 31 composed of two small discs 4 (shown in FIG. 5) in the completed state of the fastening (connection) of the retainer 2 and the joint main body 1 (refer to FIG. 4). That is to say, when a drawing force in an arrow $G_2$ direction (parting from the joint main body 1) works on the connected pipe 5, resisting force $F_3$ is generated on a position of an outer outside peak portion 36 (the nearest to the opening end side of the joint main body 1) among the outside peak portions 16 of the small-disc continuous body 31, and resisting force $F_4$ is generated on a position of an inner inside peak portion 35 (the nearest to the innermost part of the joint main body 1) among the inside peak portions 15 of the small-disc continuous body 31, and the fixation of the connected pipe 5 becomes strong further.

To describe concretely, when the drawing force in the arrow $G_2$ direction works on the connected pipe 5 in a state that the small-disc continuous body 31 hitches on the joint main body 1 and the connected pipe 5, rotational force in an arrow $R_2$ direction around the outer outside peak portion 36 as a center. That is to say, the resisting force $F_3$ to the joint main body 1 side is generated on the outer outside peak portion 36 and the resisting force $F_4$ to the connected pipe 5 is generated on the inner inside peak portion 35 in an imaginary line $L_2$ direction going through the outer outside peak portion 36 and the inner inside peak portion 35. And, the inner inside peak portion 35 bites into the bite trace 23 further.

And, radius of rotation in the arrow $R_2$ direction of which center is the outer outside peak portion 36 of the small-disc continuous body 31 having three small discs 4 (distance between the outer outside peak portion 36 and the inner inside peak portion 35) is larger than that of two small discs (refer to FIG. 5), the inner inside peak portion 35 bites into the bite trace 23 more deeply. Further, the resisting force $F_3$ and $F_4$ of the three small discs 4 are larger than the resisting force $F_1$ and $F_2$ of the two small discs 4 because inclination angle of the imaginary line $L_2$ of the three small discs 4 to the connected pipe 5 is smaller than that of the imaginary line $L_1$ of the two small discs 4 (refer to FIG. 5), and the fixation of the connected pipe 5 becomes strong further.

Therefore, the more the drawing force of the connected pipe 5 becomes, the more biting force of the inner inside peak portion 35 of the small-disc continuous body 31 to the connected pipe 5 becomes, and the fixation of the connected pipe 5 becomes strong further. And, the small-disc continuous body 31 can keep a further stable position.

Figure 7A:
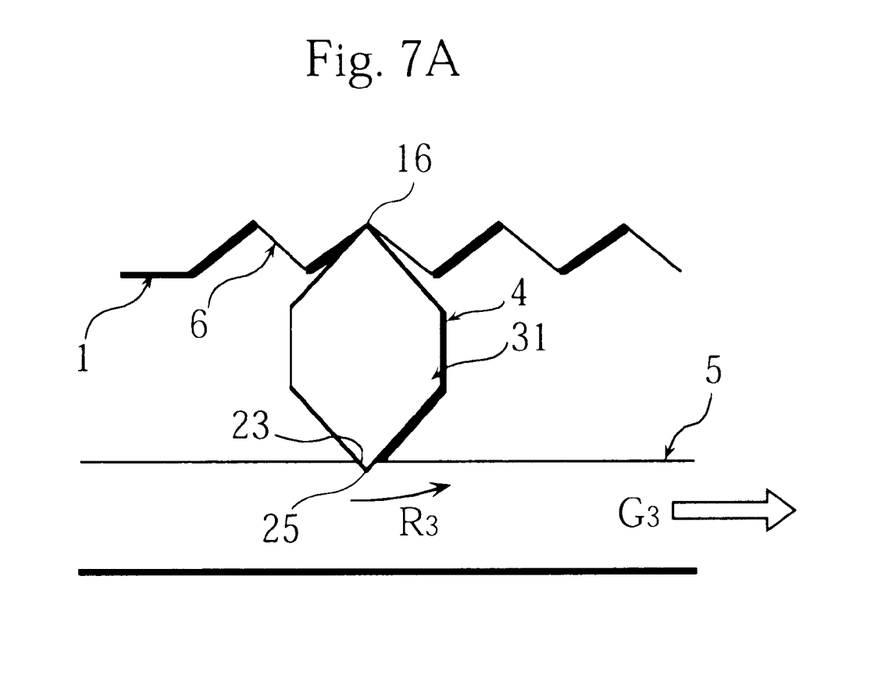
FIG. 7A is a working-explanatory view of a small-disc continuous body.
Figure 7B:
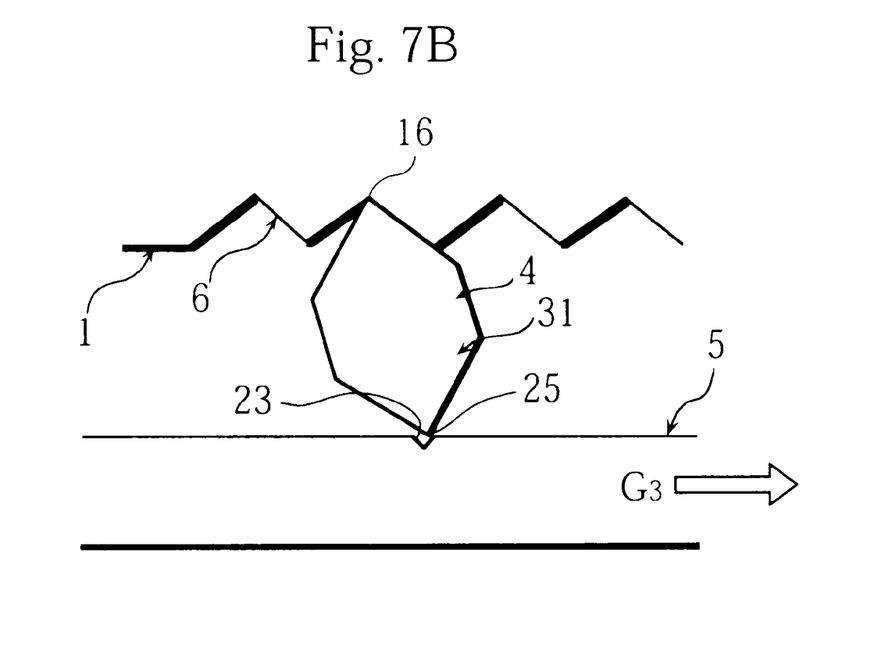
FIG. 7B is a working-explanatory view of a small-disc continuous body.

If the small-disc continuous body 31 is composed of one small disc 4, as shown in FIG. 7A, when drawing force in an arrow $G_3$ direction (parting from the joint main body 1) works on the connected pipe 5 in a completed state of fastening (connection) of the retainer 2 and the joint main body 1 (refer to FIG. 4), rotational force in an arrow $R_3$ direction around the outside peak portion 16 as a center works on the small-disc continuous body 31. And, the small-disc continuous body 31 topples down and the inside peak portion 25 goes out of the bite trace 23 as shown in FIG. 7B because resisting force generated on both of the outside peak portion 16 and the inside peak portion 25 is small. Therefore, with the small-disc continuous body 31 composed of one small disc 4, it is difficult to keep stable position, and the connected pipe 5 easily falls off.

On the other hand, in case that the small-disc continuous body 31 is composed of four or more small discs 4 not shown in Figures, fixation of the connected pipe 5 becomes stronger, and the small-disc continuous body 31 can keep a further stable position. However, it is not preferable to compose the small-disc continuous body 31 of four or more small discs 4 because it is difficult to attach the small-disc continuous body 31 to the retainer 2, strength of the retainer 2 (of plastic) becomes weak, and the retainer 2 becomes expensive. Therefore, the small-disc continuous body 31 is preferably composed of two or three small discs 4.

Figure 8:
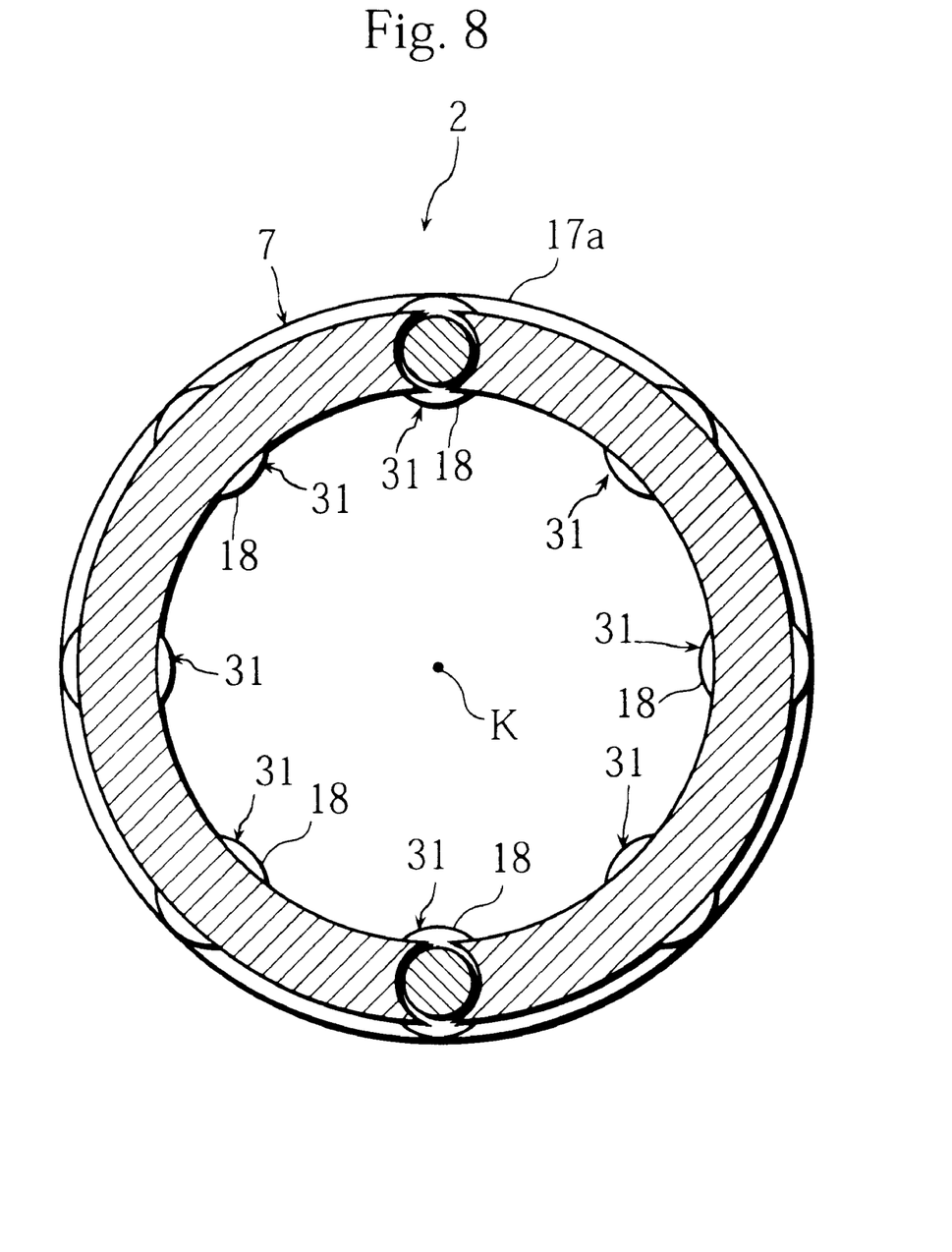
FIG. 8 is a cross-sectional side view of the retainer.

And, 6 to 12 units (8 units in the present invention) of the small-disc continuous body 31 are arranged in peripheral direction of the retainer 2 with predetermined intervals, and each unit is disposed as to be opposite to another for holding the connected pipe 5 not to deviate from an axis K.

To describe concretely, in a cross-sectional view crossing with right angles with the axis K of the retainer 2 shown in FIG. 8, two small-disc continuous body 31 are disposed on a plane at right angles with the axis K in the retainer 2 as to be opposite for 180° each other observed in the axis K direction. Each pair of the small-disc continuous bodies 31 among the eight small-disc continuous bodies 31, disposed to be opposite each other, is disposed on a plane.

Therefore, as shown in FIG. 4, the joint becomes stable without looseness in the complete state of the fastening (connection) of the joint main body 1, the retainer 2, and the connected pipe 5.

Figure 9:
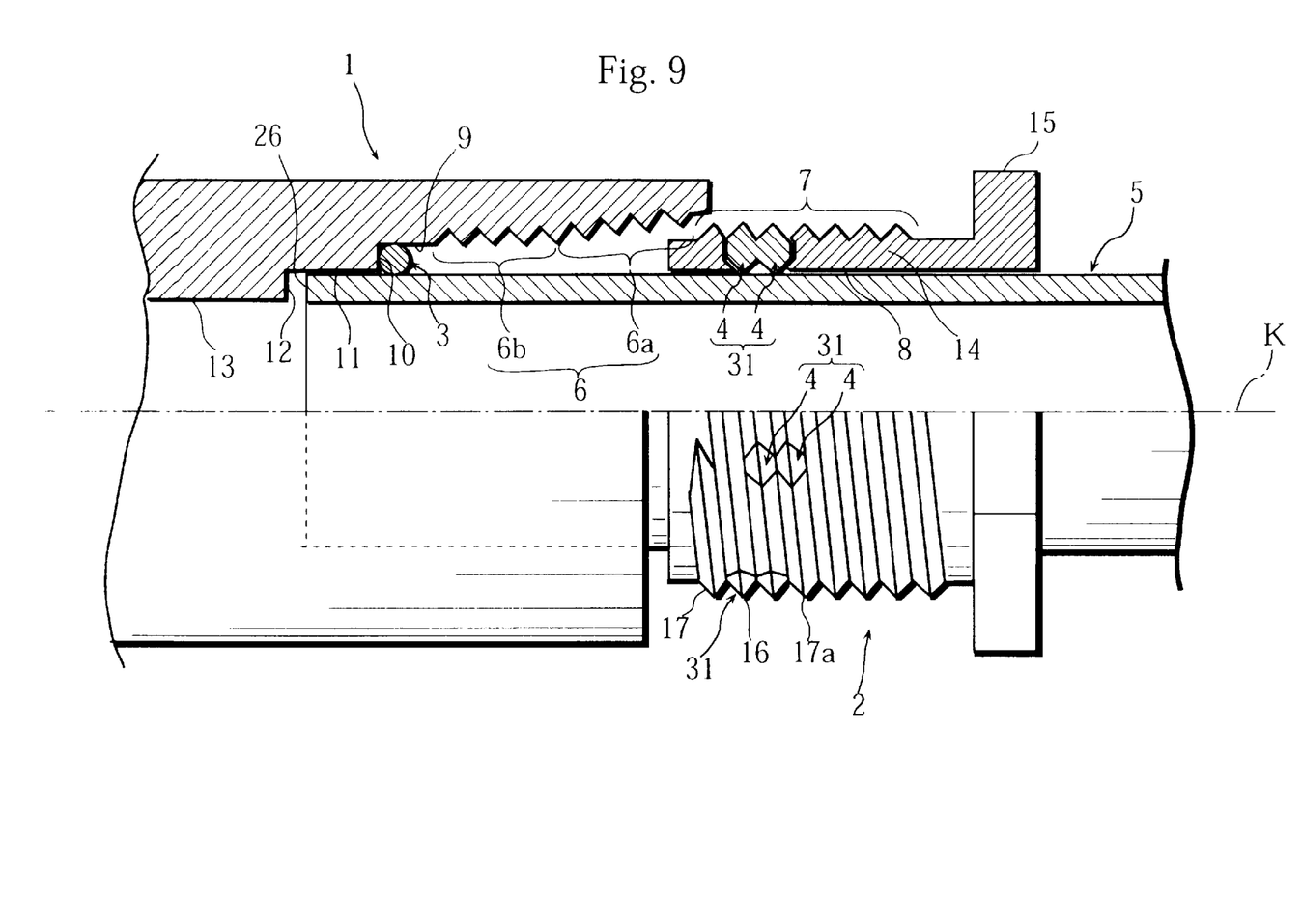
FIG. 9 is a half cross-sectional view of principal portion showing another embodiment of the pipe joint.

Next, FIG. 9 shows another embodiment of the pipe joint of the present invention. This pipe joint is provided with a joint main body 1 having a female screw portion 6 in which a tapered female screw portion 6a and a parallel female screw portion 6b are formed serially from an opening end of the female screw portion 6, a cylindrical retainer 2 having a (tapered) male screw portion 7 which screws into the female screw portion 6 of the joint main body 1, and a sealant 3. And, the retainer 2 has plural small-disc continuous bodies 31 each of which is composed of two or three small discs 4 for pipe fixation embedded in the male screw portion 7 as that a part of the small disc 4 protrudes from a peripheral side along the thread of the male screw portion T and another part of the small disc 4 protrudes from an inner peripheral face 8.

And, (as shown in FIG. 4) in completed state that the connected pipe 5 is connected by screwing the retainer 2 to the joint main body 1, (all) small-disc continuous bodies 31 screw into the parallel female screw portion 6b.

Therefore, biting depth of the small-disc continuous body 31 into a peripheral face of the connected pipe 5 is always uniform, drawing force becomes stable and reaches for an enough value, and stable connection can be kept.

Figure 10A:
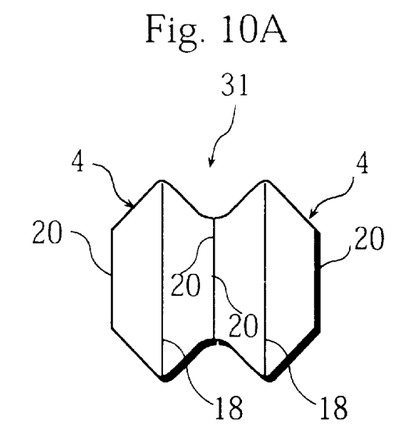
FIG. 10A is a front view showing another embodiment of the small-disc continuous body.
Figure 10B:
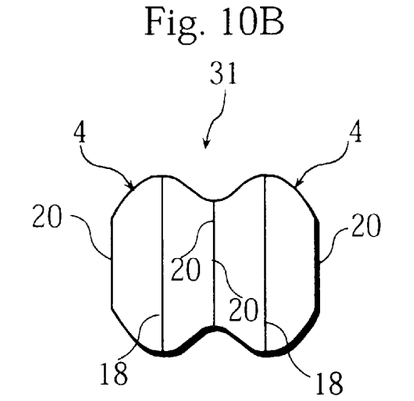
FIG. 10B is a front view showing another embodiment of the small-disc continuous body.
Figure 10C:
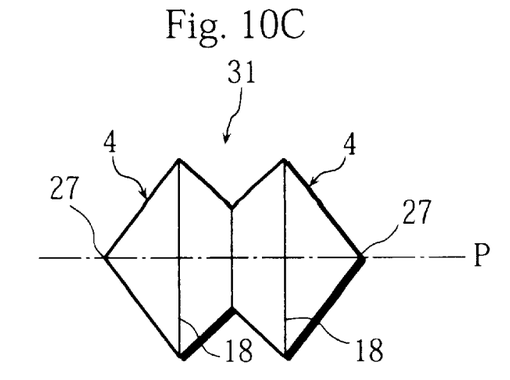
FIG. 10C is a front view showing another embodiment of the small-disc continuous body.

Next, other embodiments of the small-disc continuous body 31 are shown in FIG. 10. The small-disc continuous bodies 31 shown in FIG. 10A and FIG. 10B are formed as that vicinity of the peripheral edges 18 and a connected portion (of the circular plane portions 20) of the small discs 4 are round. Therefore, in comparison with the small-disc continuous body 31 shown in FIG. 2, these continuous bodies 31 are stable without looseness, and having high resisting force which makes fixation stronger.

And, the small-disc continuous body 31 shown in FIG. 10B is rounder, stabler, and stronger in fixation than the small-disc continuous body 31 shown in FIG. 10A.

And, the small-disc continuous body 31 shown in FIG. 10C is formed as that configuration of each end has a raised peak portion 27 conically raised from the circular peripheral edge 18 to an outer side. Therefore, the small-disc continuous body 31 embedded in the retainer 2 rotates around an axis P more easily in comparison with the small-disc continuous body 31 shown in FIG. 2.

The tapered female screw portion 6a and the male screw portion T (shown in FIG. 1), or, the tapered female screw portion 6a, the parallel female screw portion 6b, and the male screw portion 7 (shown in FIG. 9) may be double-threaded, the small-disc continuous bodies 31 uniformly bite into the whole periphery of the connected pipe 5 for 360°, become stable without looseness, and make further strong fixation. And, pitch of the thread may be enlarged, and fastening (connection) work can be completed with a small number of rotations. And, triple-threaded screws may be used for completion of the fastening (connection) work with further small number of rotations.

In the present invention, not restricted to the embodiments described above, for example, the small-disc continuous body 31 may be preferably embedded in the retainer 2 with plastic insert molding. And, the small-disc continuous body 31 may be formed with ceramic.

According to the pipe joint of the present invention, the plural. small-disc continuous bodies 31 protruding from the inner peripheral face 8 of the retainer 2 bite into the peripheral face 22 of the connected pipe 5 connected to the joint main body 1 by screwing the male screw portion 7 of the retainer 2 into the tapered female screw portion 6a of the joint main body 1 or the tapered female screw portion 6a and the parallel female screw portion 6b. The pipe joint has a simple construction, the connected pipe 5 is strongly fixed to the joint main body 1, and connecting work can be conducted easily and swiftly in a small working site thereby.

Further, the small-disc continuous body 31, composed of two or three small discs 4, holds a stable connection without looseness, and the fixation of the connected pipe 5 becomes stable and strong further.

And, according to the pipe joint of the present invention, biting depth of the small-disc continuous body 31 into the periphery of the connected pipe 5 is always uniform because the small-disc continuous body 31 screws to the parallel female screw portion 6b to complete the fastening, the drawing force becomes stable and reaches for an enough value, and stable connection can be kept.

And, the fastening (connection) work can be swiftly and easily completed with a small number of rotations because the tapered female screw portion 6a, the parallel female screw portion 6b, and the male screw portion T are double-threaded.

Further, the small-disc continuous bodies 31 uniformly bite into the whole periphery of the connected pipe 5 for 360°, keep stable connection without looseness, and make further strong fixation.

While preferred embodiments of the present invention have been described in this specification, it is to be understood that the invention is illustrative and not restrictive, because various changes are possible within the spirit and indispensable features.

What is claimed is:

1. A pipe joint comprising a joint main body having a tapered female screw portion on an opening end, and a cylindrical retainer having a male screw portion which screws into the tapered female screw portion and plural small-disc continuous bodies, each of which is composed of two or three small discs for pipe fixation embedded along a thread of the male screw portion in the retainer, as that, a part of the small disc protrudes to a peripheral side of the retainer and another part of the small-disc protrudes from an inner peripheral face of the retainer.

2. A pipe joint comprising a joint main body having a tapered female screw portion and a parallel female screw portion formed serially from an opening end, and a cylindrical retainer having a male screw portion which screws into the tapered female screw portion and the parallel female screw portion, and plural small-disc continuous bodies, each of which is composed of two or three small discs for pipe fixation embedded along a thread of the male screw portion in the retainer, as that, a part of the small disc protrudes to a peripheral side of the retainer and another part of the small-disc protrudes from an inner peripheral face of the retainer.

3. The pipe joint as set forth in claim 2, wherein the retainer is screwed into the joint main body, and the small-disc continuous body screws into the parallel female screw portion in completed state of fastening.

4. The pipe joint as set forth in claim 1, wherein the tapered female screw portion and the parallel female screw portion are double-threaded.

5. The pipe joint as set forth in claim 2 or claim 3, wherein the tapered female screw portion, the parallel female screw portion, and the male screw portion are double-threaded.

6. The pipe joint as set forth in claim 1, 2, 3, or 4, wherein two small-disc continuous bodies disposed to be opposite for 180° observed in a direction of an axis of the pipe joint are disposed on a plane crossing the axis at right angles.

7. The pipe joint as set forth in claim 5, wherein two small-disc continuous bodies disposed to be opposite for 180° observed in a direction of an axis of the pipe joint are disposed on a plane crossing the axis at right angles.

* * * * *